Patented July 8, 1924.

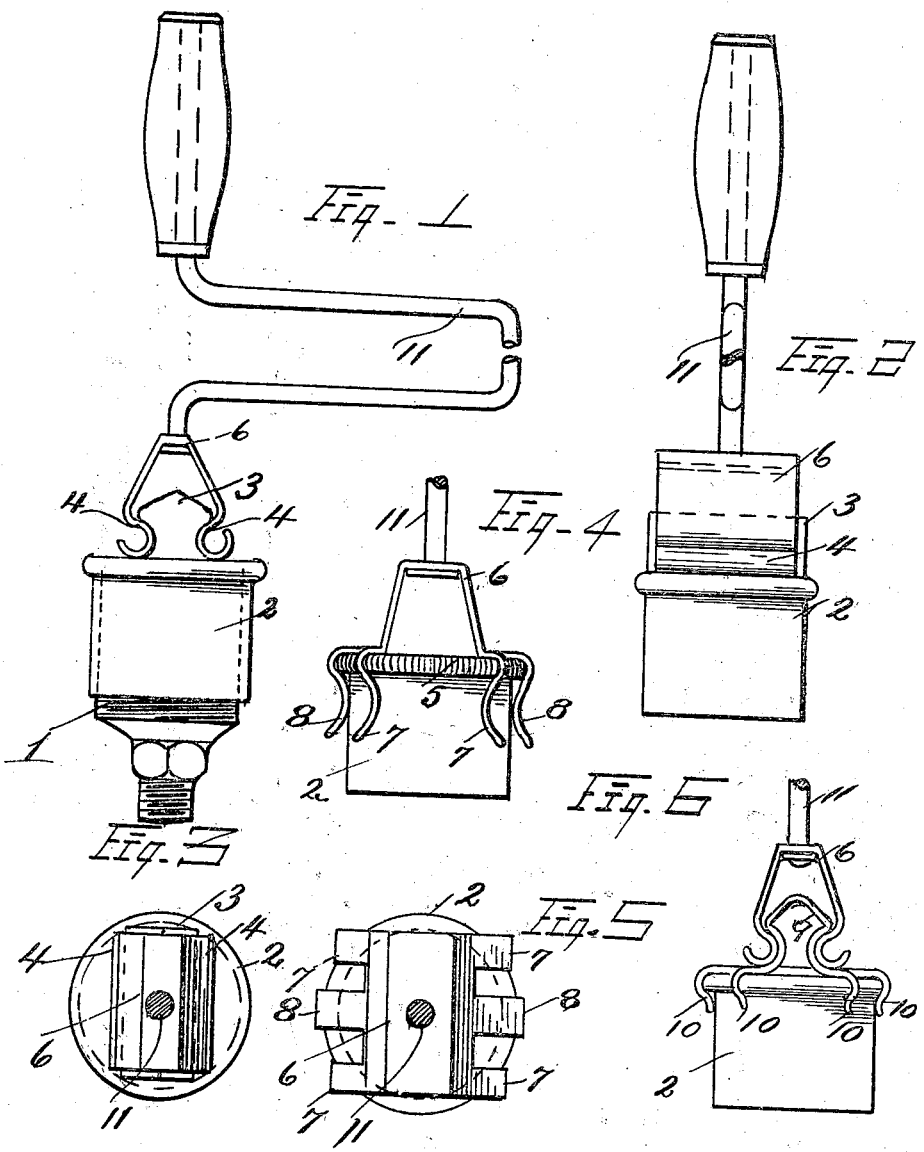

1,500,831

UNITED STATES PATENT OFFICE.

ARTHUR E. LITTLE, OF CLEVELAND, OHIO.

ATTACHABLE HANDLE FOR GREASE-CUP CAPS.

Application filed November 21, 1921. Serial No. 516,829.

*To all whom it may concern:*

Be it known that I, ARTHUR E. LITTLE, a citizen of the United States, and resident of Cleveland, in the county of Cuyahoga and State of Ohio, have invented certain new and useful Improvements in Attachable Handles for Grease-Cup Caps, of which I hereby declare the following to be a full, clear, and exact description, such as will enable others skilled in the art to which it appertains to make and use the same.

The objects of this invention are to provide a tool for facilitating the removal and subsequent replacement of the caps of grease cups for automobile users and other uses and which is also adapted to revolve the cap so as to force the grease in the cup into the grease passages and bearing which it is designed to lubricate.
To accomplish the thorough lubrication of the bearings, the cap must be first filled with grease, and afterwards screwed tightly down on the base to the limit of the threads and the action repeated until the bearings are full.

This action is often difficult to perform, since the grease makes the edges of the cap slippery, and the grease cups are often in positions inaccessible to the hand of the operator. They also soil the hands of the operator.

The invention provides means for revolving the cap, and for gripping it firmly while it is being screwed into place, and is also capable of holding the cap while it is being filled with grease, thus avoiding the necessity of touching the cap with the fingers.

The invention includes a cap for a grease cup, having an engageable member or means at its outer end permanent or otherwise, and a revolvable handle, provided with complementary gripping means, which, when engaged with the aforesaid engaging means on said cap, can be employed to rotate said cap and to remove and handle the same, when the cap is turned upside down for removing the supply of grease therein.

The invention comprises, a brace-shaped handle, provided with spring gripping members at its operating extremity, said members for enabling it to engage with and rotate the cap and after the removal of the cap serving as a retaining means therefor as hereinafter more fully described, shown in the accompanying drawings, and specifically pointed out in the claims.

In the accompanying drawings, Fig. 1 is an edge elevation of one form of the device, applied to a grease cup; Fig. 2 is a side elevation thereof; Fig. 3 is a plan thereof; Fig. 4 is a side elevation of a modified form; Fig. 5 is a plan thereof; Fig. 6 is a side elevation of a modification showing an intermediate engaging member secured upon the cap.

In these views, 1 is a grease cup; 2 is the cap therefor, which is hollow and is capable of containing a large amount of grease, which is forced into the cup and through the same, by screwing the cap down upon the cup.

The cap is provided with engaging means, such as a projecting transverse lug, 3 upon the outer face of the cap, as shown in Figs. 1 and 2, or with a projecting milled edge, 5, as shown in Fig. 4.

This projection forms an engaging means for the handle by means of which the cap can be screwed in place, or unscrewed therefrom, and retained thereby so as to be handled freely when filling it with grease.

The handle comprises a brace, 11, to which a transversely arranged spring clamping plate, 6 is secured. This plate is inclined longitudinally and radially outward upon each side of a central ridge to form spring sides, which are curled first inwardly and then outwardly at their edges, 4, 4, so as to embrace the engaging edges of the lug, 3, shown in Figs. 1 and 2, or if desired, the spring plate, 6, may be provided with extended lateral spring arms, 7 and 8 which are parallel with each other, and are bent outwardly and downwardly, as shown in Fig. 4, to engage the milled rim of the cap and the sides below the rim.

The edges of these arms, 7, will engage the milled edge of the cap, so that they will revolve the same when the handle is rapidly turned the edges of one set of arms, engaging the milled edge and acting to drive the cap in one direction, and another set of arms acting to drive the cap in the opposite direction.

The central arms, 8, extend beyond the arms, 7, and while they may not exert as great an amount of power in revolving the cap as the arms 7, 7, serve as guiding and centering devices for the other arms.

In Fig. 6, an intermediate gripping plate, 9 is permanently attached to the cap by means of the spring arms, 10, 10, and with this plate 9, a gripping plate such as shown in Fig. 1 is engaged.

The plate 9, is not a spring plate, but serves as an engaging means for the gripping plate and remains permanently upon the cap.

By means of this device the cap can be more rapidly applied to the cup and removed therefrom than it can be operated manually.

Having described the invention, what I claim as new, and desire to secure by Letters Patent, is:

1. In a device for rotating the cap of a grease cup, said grease cup provided with laterally extending engaging means, a revolvable handle, a plate upon the extremity of said handle, said plate extending at right angles thereto, the lateral sides of said plate inclined longitudinally and radially therefrom, said sides providing opposite resilient gripping means and engageable with said engaging means on said cap.

2. In a device for rotating the cap of a grease cup, said cap having engaging means, a revolvable handle, a resilient plate secured transversely of the said handle, the sides of said plate inclined longitudinally and radially outward from said handle, the edges of said sides shaped to engage the engaging means on said cap.

In testimony whereof, I hereunto set my hand this 9th day of November 1921.

ARTHUR E. LITTLE.

In presence of—
WM. M. MONROE,
CHAS. F. SIPE.